(12) United States Patent
Agarwal et al.

(10) Patent No.: US 11,770,306 B2
(45) Date of Patent: Sep. 26, 2023

(54) DEPLOYMENT OF COMPUTER SYSTEM SERVICES

(71) Applicant: International Business Machines Corporation, Armonk, NY (US)

(72) Inventors: Noopur Agarwal, Agra (IN); Chad Holliday, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 17/243,143

(22) Filed: Apr. 28, 2021

(65) Prior Publication Data
US 2022/0353154 A1 Nov. 3, 2022

(51) Int. Cl.
*H04L 41/16* (2022.01)
*H04L 41/50* (2022.01)
*H04L 41/5041* (2022.01)

(52) U.S. Cl.
CPC .......... *H04L 41/16* (2013.01); *H04L 41/5045* (2013.01); *H04L 41/5048* (2013.01); *H04L 41/5058* (2013.01)

(58) Field of Classification Search
CPC ....................................................... H04L 41/16
See application file for complete search history.

(56) References Cited

U.S. PATENT DOCUMENTS

| | | | |
|---|---|---|---|
| 8,533,537 B2 | 9/2013 | Nemecek et al. | |
| 8,626,698 B1 | 1/2014 | Nikolaev et al. | |
| 9,612,821 B2 | 4/2017 | Iyer et al. | |
| 10,684,851 B2 | 6/2020 | Burli et al. | |
| 2014/0297874 A1* | 10/2014 | Matsubara | H04L 67/16 709/226 |
| 2019/0258755 A1* | 8/2019 | Minwalla | G06N 5/003 |

OTHER PUBLICATIONS

Bhatia et al., "Forecasting Failures: Deploying a Successful Predictive Maintenance Solution," https://www.wwt.com/article/forecasting-failures-deploying-successful-predictive-maintenance-solution, Digital, Data Analytics & AI, Jun. 12, 2020, printed Feb. 22, 2021, 10 pgs.
Leitner et al., "Modelling and Managing Deployment Costs of Microservice-Based Cloud Applications," https://www.zora.uzh.ch/id/eprint/126370/1/ucc_acm_16.pdf, Zurich Open Repository and Archive, University of Urich, Main Library, 2016, 11 pgs.
Mell et al., "The NIST Definition of Cloud Computing," Recommendations of the National Institute of Standards and Technology, U.S. Department of Commerce, Special Publication 800-145, Sep. 2011, 7 pgs.
Zhang et al., "Software field failure rate prediction before software deployment," https://www.sciencedirect.com/science/article/abs/pii/S0164121205001081?via%3Dihub, The Journal of Systems and Software 79 (2006) 291-300.

* cited by examiner

*Primary Examiner* — Adnan M Mirza
(74) *Attorney, Agent, or Firm* — Kelli D. Morin

(57) ABSTRACT

Provided is a method for performing an action based on a predictive outcome of an intended service deployment. The method includes receiving information pertaining to an intended service deployment. The method further includes receiving data pertaining to the intended service deployment based on the received information. The method further includes determining a predictive outcome of the intended service deployment based on the received data. The method further includes performing an action based on the predictive outcome.

19 Claims, 6 Drawing Sheets

DEPLOYMENT OF COMPUTER SYSTEM SERVICES

BACKGROUND

The present disclosure relates generally to the field of computer system services, and more particularly to predictive outcomes of the deployment of computer system services.

Information technology (IT) orchestration includes the large-scale coordination of automated computing tasks as a process or a workflow. As computing tasks become increasingly complex and interrelated to enable increasingly complex workflows and processes, orchestration of those tasks to run effectively and efficiently becomes increasingly valuable.

SUMMARY

Embodiments of the present disclosure include a method, computer program product, and system for performing an action based on a predictive outcome of an intended deployment of computer system services. The method includes receiving information pertaining to an intended service deployment. The method further includes receiving data pertaining to the intended service deployment based on the received information. The method further includes determining a predictive outcome of the intended service deployment based on the received data. The method further includes performing an action based on the predictive outcome.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
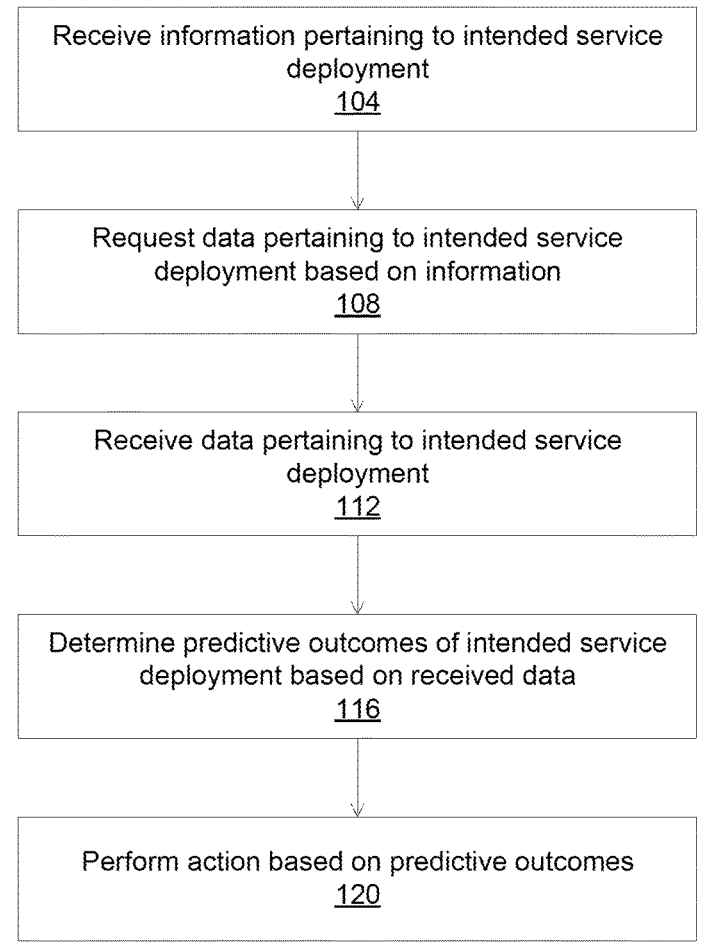
FIG. 1 illustrates a flowchart of an example method for performing an action based on a predictive outcome for an intended service deployment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computer system services, and more particularly to performing an action based on a predictive outcome of the deployment of computer system services. While the present disclosure is not necessarily limited to such applications, various aspects of the disclosure may be appreciated through a discussion of various examples using this context.

IT services can be made up of automated computing tasks involving, without limitation, infrastructure, middleware, software, configurations, and combinations thereof. The automated computing tasks may be organized into, without limitation, programs, bundles, infrastructure, and combinations thereof. Deploying a service can refer to the initiation of one or more IT execution steps, which will subsequently utilize, for example, programs, bundles, and/or clusters of infrastructure, middleware, and/or software.

As such services become increasingly complex and interrelated (for example, the deployment of some highly complex workflows may include many nested deployments) to enable increasingly complex workflows and processes, orchestration of those tasks to run effectively and efficiently becomes increasingly challenging and also increasingly valuable.

More specifically, the computing time and space resources required for the deployment of a service increase with the size and complexity of the service. For example, each additional task and each additional relationship between tasks increases the amount of time required for deployment and execution of a service. Likewise, each additional task and relationship between tasks may increase the amount of computing resources required for deployment and execution of a service. Accordingly, as such services become increasingly complex and interrelated, the resources required for deployment of the services also increases.

Furthermore, each additional task and each additional relationship between tasks introduces another opportunity for failure of the service as every task and every relationship between tasks has its own risk of failure. Thus, as such services become increasingly complex and interrelated, more opportunities for failure of the services are introduced.

Therefore, it becomes increasingly valuable for a user to be provided with a prediction of the likelihood of success of the deployment of a service prior to committing the time and resources to that deployment. For example, if a user is provided with a prediction that, for a particular deployment of a particular service, there is a 45% chance of successful completion of that service, the user may choose not to deploy that service. In other words, the user is provided with a prediction regarding whether or not it is reasonable to commit the necessary time and resources to the deployment of the service prior to actually committing those resources. Moreover, such a prediction is valuable for an entire community of users sharing such resources. Avoiding the commitment of time and resources to a deployment that is unlikely to succeed allows those resources to remain available for other uses and/or other users.

For example, a cluster deployment may require infrastructure, configuration, and software, importing that cluster into another cloud, and performing an application deployment onto that managed cluster. Predicting the success rate of the deployment prior to deployment can help minimize wasted time and resources and frees up those resources for deployments which have a higher likelihood of success.

Some existing technologies provide users with predictions regarding the cost of a service deployment prior to deployment. However, the cost of a service deployment is only one factor to be considered when determining whether or not to deploy the service. It is desirable to additionally provide users with predictions regarding the estimated time to completion and likelihood of success of a particular deployment of a particular service.

Some existing technologies provide users with predictions based only on infrastructure availability. However, the reliability of such predictions is limited due to their failure to take into account other analytics that determine the success rate of a service. It is desirable to additionally provide users with predictions that holistically consider an entire set of available analytics to determine the success rate of a service.

Embodiments of the present disclosure may overcome the above, and other, problems by performing actions, such as providing users with predictions and recommendations regarding estimated time to completion and likelihood of success for a particular service deployment, prior to the service deployment, that are based on holistic analytics.

Turning now to the figures, FIG. 1 depicts a flowchart of an illustrative method 100 for performing an action based on a predictive outcome of an intended service deployment, in accordance with embodiments of the present disclosure. The method 100 may be performed by a computer system.

Figure 2:
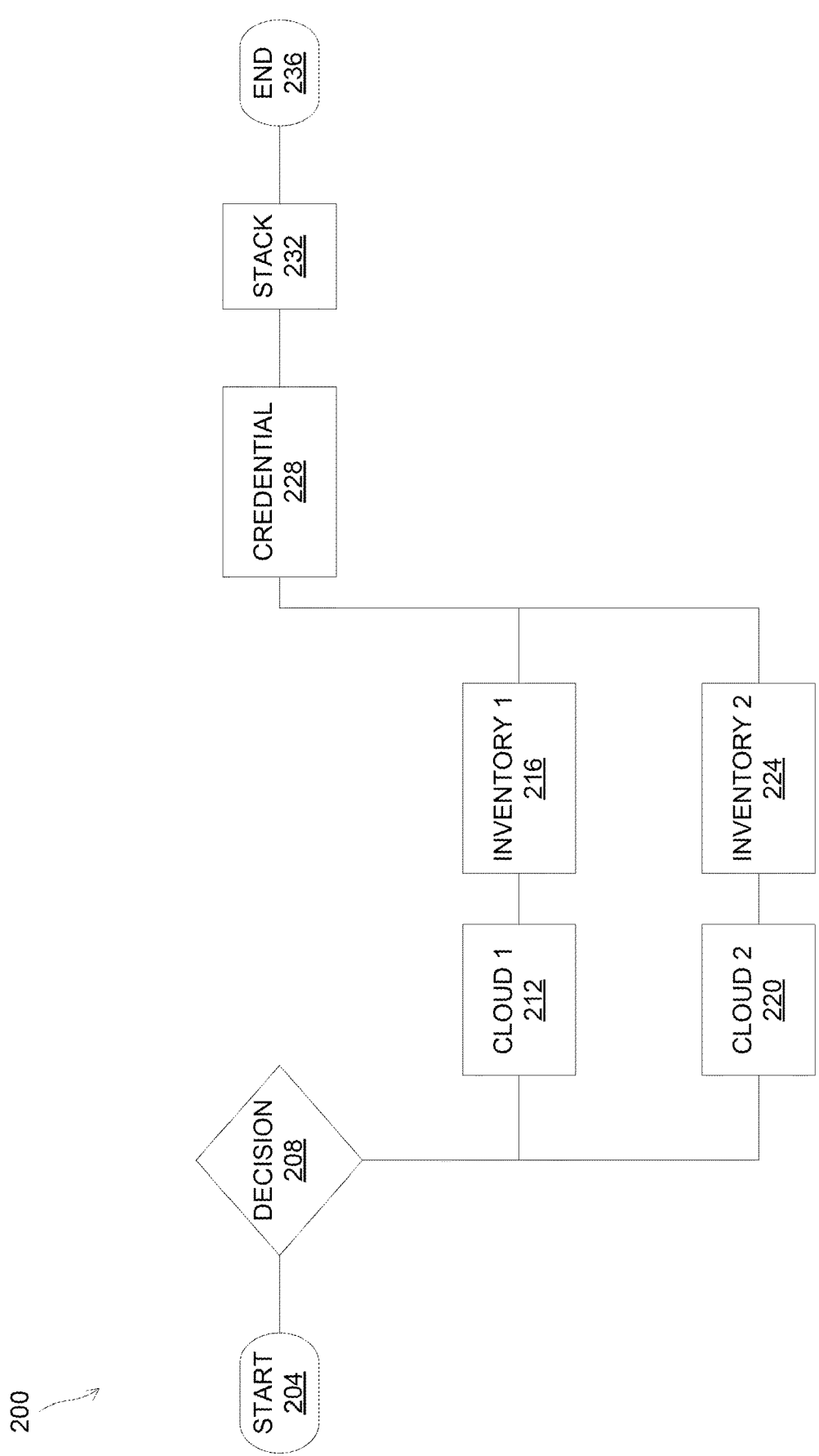
FIG. 2 illustrates a schematic drawing of an example user interface for preparing for an intended service deployment, in accordance with embodiments of the present disclosure.

FIG. 2 provides a simplified example to illustrate the performance of the method 100. In particular, FIG. 2 depicts a user interface 200, which illustrates a user's experience in preparing to deploy a service. As such, the user interface 200 includes a "START" 204, which represents the beginning of the user's interaction with the user interface 200 in preparation to deploy a service. The user interface 200 further includes a "DECISION" 208, at which the user is presented with more than one option for deploying the service. In the example illustrated by the user interface 200, the options presented to the user are represented by "CLOUD 1" 212 and "CLOUD 2" 220, which indicate on which cloud service provider(s) the user is considering deploying the service. The user interface 200 further includes "INVENTORY 1" 216, which represents an inventory that corresponds with "CLOUD 1" 212, and "INVENTORY 2" 224, which represents an inventory that corresponds with "CLOUD 2" 220.

The user interface 200 further includes "CREDENTIAL" 228, which represents a credential utilized during service deployment. The user interface 200 further includes "STACK" 232, which represents a software stack utilized during service deployment. The user interface 200 further includes "END" 236, which represents the end of the user's interaction with the user interface 200 in preparation to deploy a service.

Returning now to FIG. 1, the method 100 includes operation 104, wherein information pertaining to an intended service deployment is received. In other words, at operation 104, the computing system receives information pertaining to an intended service deployment. In accordance with at least one embodiment of the present disclosure, the information is received from a user. More specifically, a user who is considering or preparing to deploy a service provides information pertaining to that intended service deployment to the system.

By way of non-limiting example, the user may provide information pertaining to the cloud provider on which the service is intended to be deployed and/or information pertaining to the service itself. For example, the user may provide information regarding infrastructure, middleware, software, programs, bundles, and/or clusters implicated in the intended service deployment. In accordance with at least one embodiment of the present disclosure, the user may provide such information by indicating intended choices or making selections where there is more than one choice for an aspect or feature of the intended service deployment. For example, the user may indicate which cloud provider, which type of virtual machine, which type of operating system, and/or which type of software is being considered for use for the intended service deployment.

In the context of the illustrative example of the user interface 200 provided in FIG. 2, in the performance of operation 104 of the method 100, a user is provided with a selection, represented by "DECISION" 208. The "DECISION" 208 shown in FIG. 2 allows the user to select "CLOUD 1" 212 or "CLOUD 2" 220. By selecting "CLOUD 1" 212 or "CLOUD 2" 220, the user indicates which cloud service provider to use for the user's service deployment. In other words, in this illustrative example, by making the selection at "DECISION" 208, the user provides information pertaining to the intended service deployment, as in operation 104.

Returning to FIG. 1, at operation 108, once the information pertaining to the intended service deployment has been received, data pertaining to the intended service deployment, based on the received information, is requested. In accordance with at least one embodiment of the present disclosure, at operation 108, the computing system requests data pertaining to the intended service deployment based on the information received in operation 104. Some illustrative non-limiting examples of requested data and sources of requested data are discussed below.

In accordance with at least one embodiment of the present disclosure, requesting data can include data mining from multiple sources. For example, the computing system may request data pertaining to use metrics from prior deployments of the same service. Use metrics can include, for example, a success rate of prior deployments of the same service. The computing system may request data captured from logs or other data storage entity from prior deployments of the same service. Such data may indicate whether, where, and/or how the service has failed in past deployments.

The computing system may request data pertaining to a rate of change of the services. A rate of change of the services refers to a number of changes (such as, for example, updates) made to the service over a particular period of time. This rate of change may correlate to a level of instability that has been introduced into deployment of the service. Greater levels of instability may correlate to lower likelihoods of successful deployment for the services.

The computing system may request data pertaining to infrastructure metrics (such as, for example, availability or capacity) for the requested service. The computing system may request data pertaining to the size or number of resources required for deployment of the service. The computing system may request data pertaining to which dates and/or times are more likely or less likely to result in successful deployments of the service. Such data may correlate to patterns in traffic and/or capacity in which greater or lesser demands are typically made on the resources required for deployment of the service.

The computing system may request data pertaining to the amount of time that successful executions of the service deployment have taken in the past. More specifically, the computing system may request data pertaining to amounts of time taken for successful executions of the service deployment when the service deployment had various configurations or parameters.

In the context of the illustrative embodiment shown in FIG. 2, if the user selects "CLOUD 1" 212 at "DECISION" 208, the computing system may request data including use metrics from prior deployments of the same service, including a success rate and whether, where, and/or how the service has failed, when using "CLOUD 1" 212. The computing system may further request data including the infrastructure (such as, for example, capacity) available on "CLOUD 1" 212. The computing system may further request data including dates and/or times where deployments are typically more likely or less likely to succeed on "CLOUD 1" 212.

Moreover, requesting data may further include requesting data pertaining to independent components which correspond to the user selected components. For example, in the context of the illustrative embodiment shown in FIG. 2, the computing system may further request data pertaining to "INVENTORY 1" 216, which corresponds to "CLOUD 1" 212. In such embodiments, the computing system may request data pertaining to the "INVENTORY 1" 216 that is substantially similar to that described above with reference to "CLOUD 1" 212.

Returning to the method 100, at operation 112, data pertaining to the intended service deployment is received. In particular, at operation 112, the computer system receives the data that was requested at operation 108. Accordingly, in the context of the illustrative embodiment shown in FIG. 2, in the performance of operation 112, the computer system may receive: use metrics from prior deployments of the same service on "CLOUD 1" 212; data pertaining to the likelihood of success in utilizing "INVENTORY 1" 216 in the deployment of the service; available capacity on "CLOUD 1" 212; and days of the week and times of day in which the deployment of the service is more likely to succeed on "CLOUD 1" 212.

At operation 116, one or more predictive outcomes of the intended service deployment are determined based on the data received at operation 112. In particular, at operation 116, the computer system determines predictive outcomes of the intended service deployment based on the received data. In other words, the computer system takes the received data into consideration to determine predictive outcomes of the intended service deployment. More specifically, the computer system compiles and/or integrates a variety of data received from multiple sources to determine one or more holistic predictive assessments of the deployment of the service. In accordance with at least one embodiment of the present disclosure, the performance of operation 116 includes applying one or more artificial intelligence ("AI") algorithms to the received data.

The predictive outcomes can include, for example, a likelihood of success of the deployed service, based on the received data. The predictive outcomes can include, for example, an amount of time likely to be required for the deployment of the service, based on the received data.

In accordance with at least some embodiments of the present disclosure, such predictive outcomes can be based on intermediate determinations made using the received data. For example, an intermediate determination may indicate which operations of a service can be run sequentially or in parallel during deployment. The computer system may use such an intermediate determination to determine a predictive outcome by determining a best path of execution in which execution of the service deployment is successfully completed in the least amount of time. Thus, in other words, in accordance with at least some embodiments of the present disclosure, determining predictive outcomes at operation 116 further includes making at least one intermediate determination.

In the context of the illustrative embodiment shown in FIG. 2, in the performance of operation 116, the computer system determines predictive outcomes of the intended service deployment based on the received data. As noted above, in accordance with at least some embodiments of the present disclosure, determining the predicted outcomes includes making at least one intermediate determination based on the received data.

More specifically, the computer system may use the received metrics from prior deployments of the same service on "CLOUD 1" 212 to determine that deployments of that service on "CLOUD 1" 212 typically have a particular success rate. The computer system may use the received data pertaining to the likelihood of success in utilizing "INVENTORY 1" 216 in the deployment of the service to determine that deployments of that service on "CLOUD 1" 212 typically have a particular failure rate. The computer system may use the received days of the week and times of day in which the deployment of the service is more likely to succeed on "CLOUD 1" 212 to determine a particular time at which the deployment is most likely to succeed in the least amount of time. In this example, the particular success rate, the particular failure rate, and the particular time can be intermediate determinations or can be predictive outcomes determined using intermediate determinations.

The method 100 further includes operation 120, wherein an action is performed based on the predictive outcomes determined at operation 116. In accordance with at least some embodiments of the present disclosure, the action may include providing a user with a result. The result may be qualitative or quantitative. Such a result may include, for example, a predicted likelihood of success of the service deployment, given the received data. Additionally, or alternatively, such a result may include a predicted amount of time required for successful completion of the deployment of the service.

In the context of the illustrative embodiment shown in FIG. 2, in the performance of operation 120, the computer system may provide the user with a qualitative or quantitative likelihood of success of deploying the service on "CLOUD 1" 212. For example, the computer system may provide the user with a predicted result of "unlikely" or "25% likely" to succeed. Additionally, or alternatively the computer system may provide the user with a predicted result of "moderate" or "greater than 5 hours" or "6 hours, 34 minutes" regarding the amount of time required for successful completion of the deployment of the service.

In accordance with at least some embodiments of the present disclosure, performing the action at operation 120 may include providing a user with a suggestion. Such a suggestion may include, for example, a remediation to be applied to the service or the intended service deployment to improve the likelihood of a successful deployment or to reduce the amount of time required to complete a successful deployment of the service.

In the context of the illustrative embodiment shown in FIG. 2, for example, in such embodiments, the computer system may provide the user with a suggestion to deploy the service at 3:00 am on "CLOUD 1" 212 to improve the likelihood of a successful deployment or to reduce the amount of time required to complete a successful deployment of the service.

In accordance with at least some embodiments of the present disclosure, performing the action at operation 120 may include automatically generating one or more comparative predictive outcomes. In such embodiments, the performance of operation 120 further includes the performance of an additional method (which may also be referred to as a "sub-method") 300, which is depicted in FIG. 3.

Figure 3:
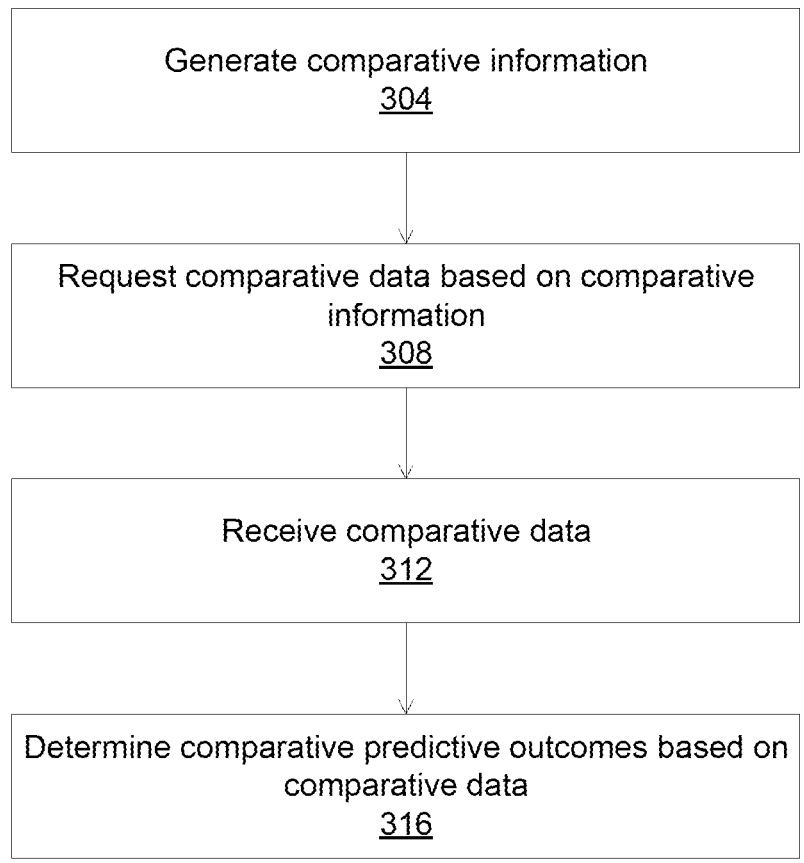
FIG. 3 illustrates a flowchart of an example method for determining comparative predictive outcomes based on comparative data, in accordance with embodiments of the present disclosure.

As shown in FIG. 3, the method 300 includes, at operation 304, generating comparative information. More specifically, in the performance of operation 304, the computer system generates comparative information. Such comparative information is substantially similar to the information received from the user at operation 104 and includes one or more changes relative to the received information. In accordance with at least some embodiments, the computer system begins by making a duplicate copy of the received information and then makes at least one change to the duplicate copy such that the comparative information differs from the received information by that at least one change.

In the context of the illustrative embodiment shown in FIG. 2, the performance of operation 304 includes making a duplicate copy of the received information, including the user's selection of "CLOUD 1" 212. The performance of operation 304 further includes making a change to the duplicate copy. In this particular example, generating the comparative information includes changing the selection of "CLOUD 1" 212 to "CLOUD 2" 220 in the duplicate copy.

At operation 308, the computer system then requests comparative data corresponding to the generated comparative information. At operation 312, the computer system receives the requested comparative data. In accordance with at least some embodiments of the present disclosure, the computer system can request and receive comparative data in substantially the same manner that the computer system requested and received data in the performance of operations 108 and 112.

At operation 316, the computer system then determines comparative predictive outcomes based on the received comparative data. In such embodiments, performing the action at operation 120 can include providing the user with the predictive outcomes determined at operation 116 of method 100 and with the comparative predictive outcomes determined at operation 316 of method 300. Such embodiments facilitate the user's ability to make an informed decision regarding their intended service deployment.

In the context of the illustrative embodiment shown in FIG. 2, the performance of operation 316 includes determining the predictive outcomes based on the comparative data received for the comparative information, including the selection of "CLOUD 2" 220. In other words, the computer system determines comparative predictive outcomes that are substantially similar to the predictive outcomes determined at operation 116 of method 100 except that the comparative data on which the comparative predictive outcomes are based is received for the service deployment scenario in which "CLOUD 2" 220 has been selected. By way of example, the comparative predictive outcomes generated at operation 316 can include "60% likely" to succeed and/or "12 hours, 13 minutes" regarding the amount of time required for successful completion of the deployment of the service.

Accordingly, in such embodiments, at operation 120, the computer system provides the user with both the predictive outcomes based on the user's selection of "CLOUD 1" 212 determined at operation 116 and the comparative predictive outcomes based on the computer system's automatically generated selection of "CLOUD 2" 220 determined at operation 316. For example, the computer system provides the user with "25% likely" and/or "6 hours, 34 minutes" with respect to "CLOUD 1" 212 and also provides the user with "60% likely" and/or "12 hours, 13 minutes" with respect to "CLOUD 2" 220. The automatically generated comparative predictive outcome provides the user with useful information regarding their intended service deployment as well as further alternative information that the user may also consider in their decision regarding the service deployment.

In accordance with at least some embodiments of the present disclosure, in the performance of operation 120, the computer system can also provide the user with the specific changes that were made in the comparative information relative to the received information. Such embodiments further facilitate the user's ability to make an informed decision regarding their intended service deployment. Furthermore, by providing comparative predictive outcomes, such embodiments may also reveal sources of particular issues in the intended service deployment.

In accordance with at least one embodiment of the present disclosure, in the performance of operation 120, the computer system can automatically generate comparative predictive outcomes only if a predictive outcome exceeds a particular threshold (for example, if the likelihood of success is less than 50% and/or if the time to successful completion is greater than 12 hours) or falls within a particular range. Alternatively, in accordance with at least one embodiment of the present disclosure, the computer system can automatically generate comparative predictive outcomes regardless of the predictive outcome.

In accordance with at least one embodiment of the present disclosure, in the performance of operation 120, the computer system can automatically generate one comparative predictive outcome. Alternatively, in accordance with at least one embodiment of the present disclosure, the computer system can automatically generate more than one comparative predictive outcome. In accordance with at least one embodiment, the number of comparative predictive outcomes to be automatically generated can be predetermined. In accordance with at least one embodiment, the number of comparative predictive outcomes can depend on the number of variables of the service being deployed. For example, a greater number of comparative predictive outcomes may be generated for more complex services, which depend on a greater number of variables.

In accordance with at least one embodiment of the present disclosure, in the performance of operation 120, the computer system can automatically deploy the service in accordance with the received information if the predictive outcome exceeds a particular threshold (for example, if the likelihood of success is greater than 80% and/or if the time to successful completion is less than 2 hours) or falls within a particular range.

Alternatively, in accordance with at least one embodiment of the present disclosure, the computer system can automatically deploy the service in accordance with the generated comparative information if the predictive outcome exceeds a first threshold (for example, if the likelihood of success is less than 50% and/or if the time to successful completion is greater than 12 hours) and the comparative predictive outcome exceeds a second threshold (for example, if the likelihood of success is greater than 80% and/or if the time to successful completion is less than 2 hours). In some such embodiments, the computer system can automatically deploy the service in accordance with the generated comparative information only if a difference between the predictive outcome and the comparative predictive outcome exceeds a threshold.

In accordance with at least one embodiment, a predetermined number of comparative predictive outcomes may be limited by an upper limit. This may become increasingly useful as services become increasingly complex. In such embodiments, selecting which comparative predictive outcomes to present to the user may include ranking the comparative predictive outcomes according to their likelihood of success and/or amount of time required to complete a successful deployment. In such embodiments, those comparative predictive outcomes receiving the highest likelihood of success and/or least amount of time required to complete a successful deployment may be presented to the user.

It is to be understood that the aforementioned advantages are example advantages and should not be construed as limiting. Embodiments of the present disclosure can contain all, some, or none of the aforementioned advantages while remaining within the spirit and scope of the present disclosure.

Figure 4:
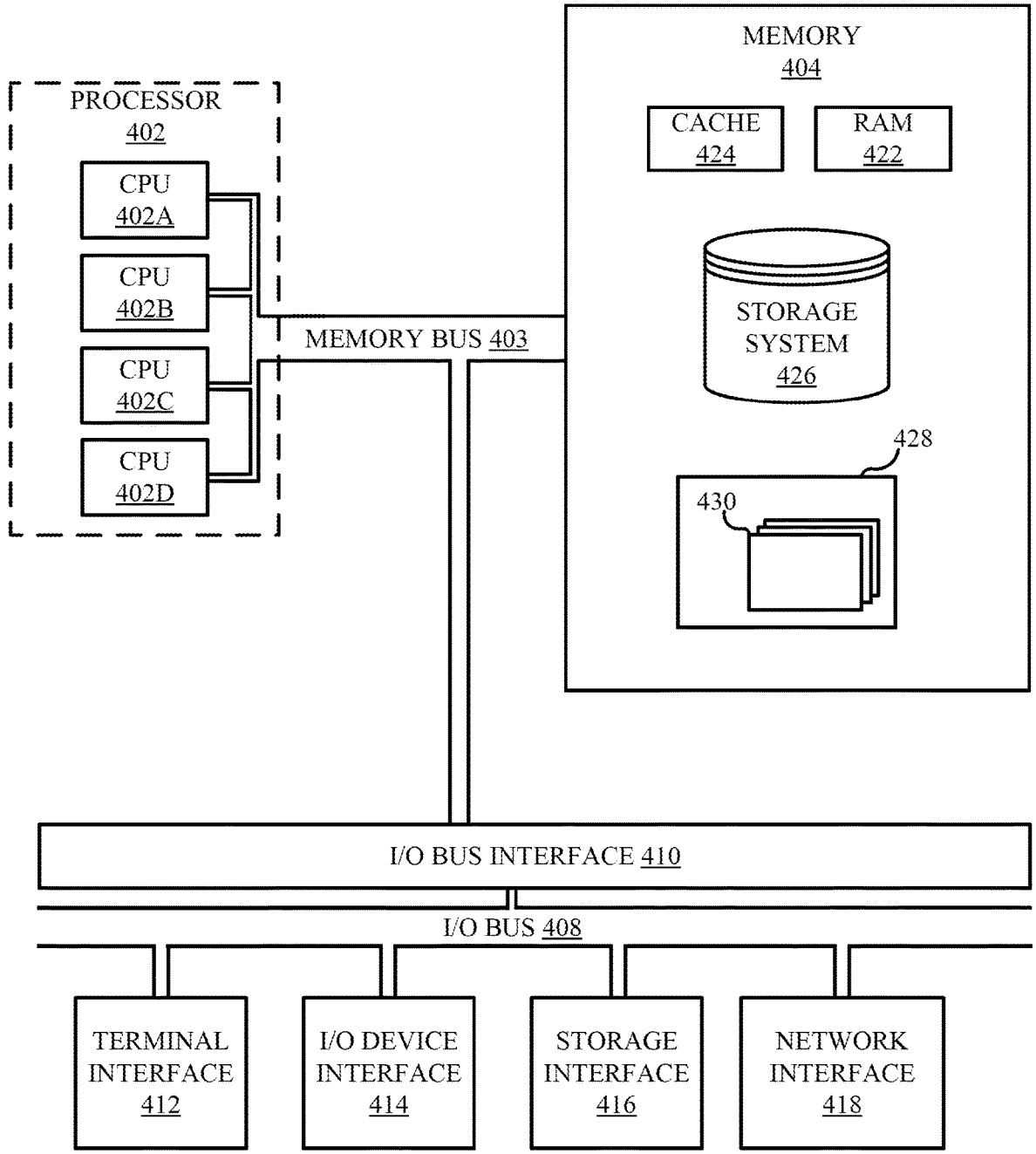
FIG. 4 illustrates a high-level block diagram of an example computer system that may be used in implementing one or more of the methods, tools, and modules, and any related functions, described herein, in accordance with embodiments of the present disclosure.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
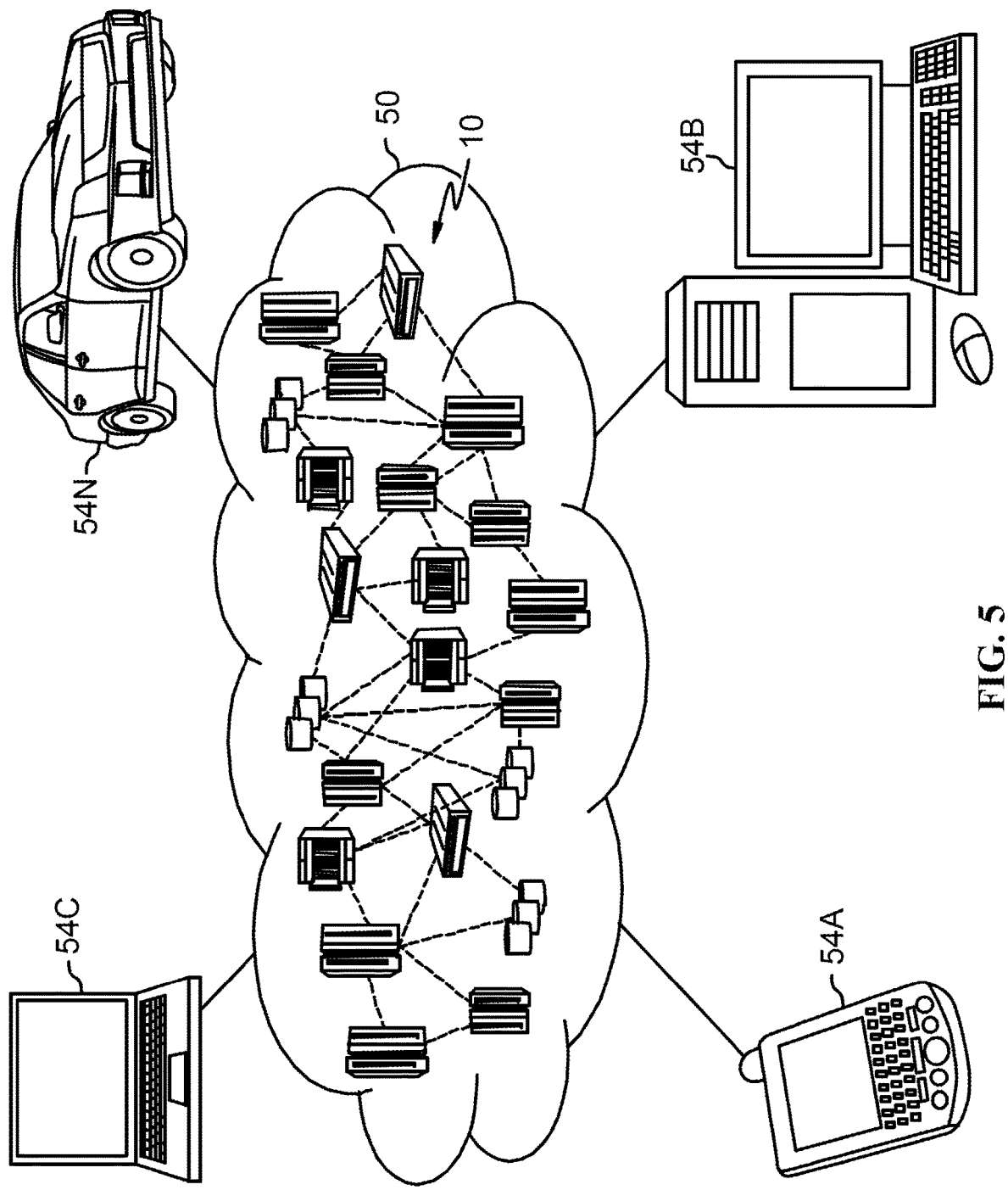
FIG. 5 depicts a cloud computing environment, in accordance with embodiments of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
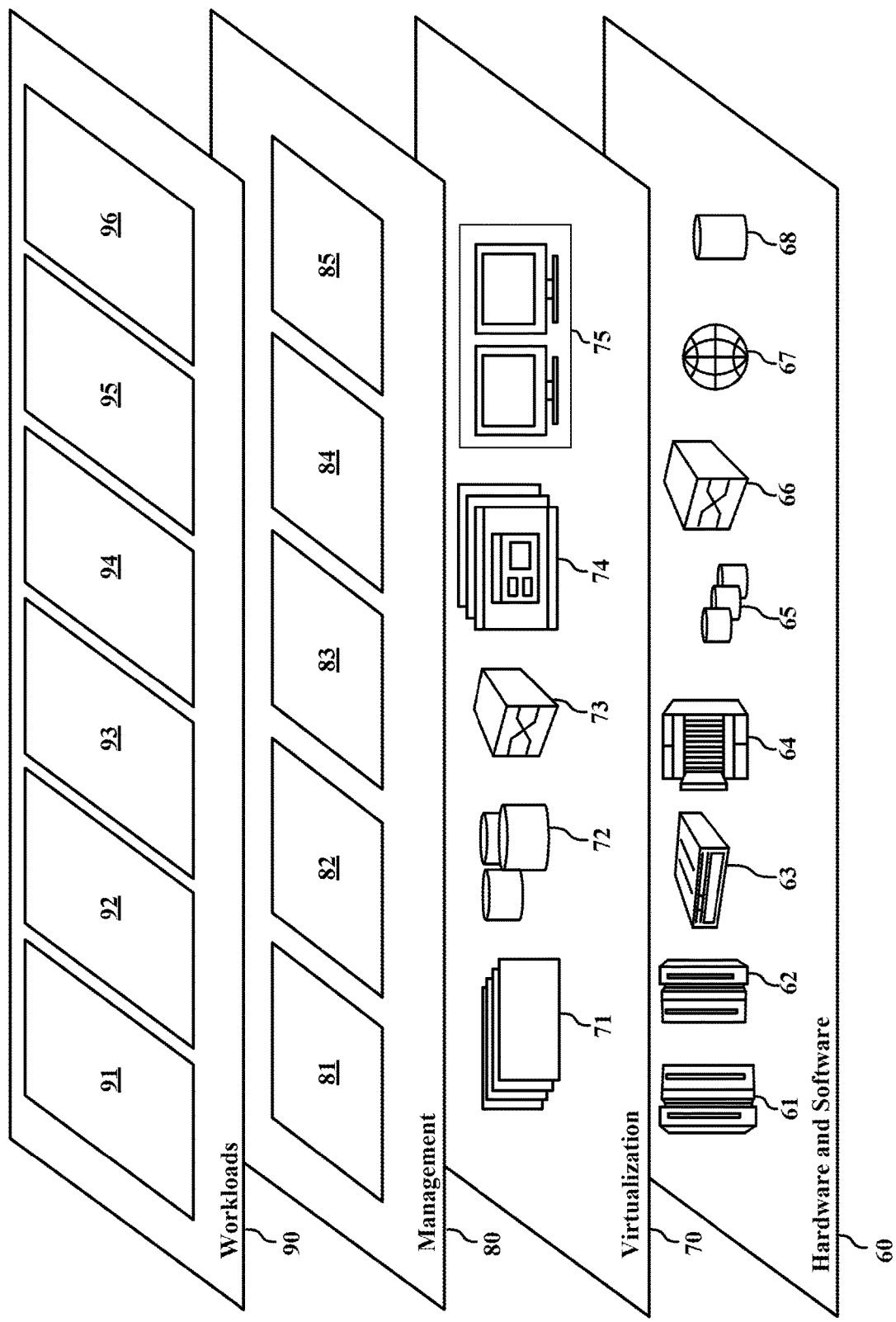
FIG. 6 depicts abstraction model layers, in accordance with embodiments of the present disclosure.

Referring now to FIG. 6, a set of functional abstraction layers provided by cloud computing environment 50 (FIG. 5) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

In addition to embodiments described above, other embodiments having fewer operational steps, more operational steps, or different operational steps are contemplated. Also, some embodiments may perform some or all of the above operational steps in a different order. Furthermore, multiple operations may occur at the same time or as an internal part of a larger process. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100*a*, 100*b*, 100*c*) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method, comprising:
   receiving information pertaining to an intended service deployment;
   receiving data pertaining to the intended service deployment based on the received information, wherein the data indicates conditions pertaining to previous deployment failures for the service;

determining a predictive outcome of the intended service deployment based on the conditions pertaining to previous deployment failures for the service; and performing an action based on the predictive outcome, wherein:

performing the action includes:

comparing the predictive outcome to a threshold; and automatically generating comparative information pertaining to the intended service deployment in response to determining that the predictive outcome exceeds the threshold;

the comparative information is based on the received information; and the comparative information is different from the received information.

2. The method of claim 1, wherein receiving information pertaining to the intended service deployment includes receiving user input pertaining to the intended service deployment.

3. The method of claim 1, wherein:

receiving information pertaining to the intended service deployment includes providing a user with a selection; and the received information is input by the user in response to the provided selection.

4. The method of claim 1, wherein receiving data includes data mining from at least one source associated with the intended service deployment.

5. The method of claim 1, wherein determining the predictive outcome includes applying at least one artificial intelligence algorithm to the received data.

6. The method of claim 1, wherein:

generating comparative information includes making a duplicate copy of the received information and making at least one change to the duplicate copy.

7. The method of claim 1, wherein:

performing the action further includes receiving comparative data based on the comparative information.

8. The method of claim 7, wherein:

performing the action further includes determining a comparative predictive outcome based on the comparative data.

9. A computer program product comprising a computer readable storage medium having program instructions embodied therewith, the program instructions executable by processor to cause the processor to perform a method comprising:

receiving information pertaining to an intended service deployment;

receiving data pertaining to the intended service deployment based on the received information, wherein the data indicates a number of changes made to the service over a period of time that indicates a rate of change of the service and corresponds to a level of instability of the service;

determining a predictive outcome of the intended service deployment based on the number of changes made to the service over the period of time; and performing an action based on the predictive outcome.

10. The computer program product of claim 9, wherein receiving information pertaining to the intended service deployment includes receiving user input pertaining to the intended service deployment.

11. The computer program product of claim 9, wherein:

performing the action includes automatically generating comparative information pertaining to the intended service deployment;

the comparative information is based on the received information; and the comparative information is different from the received information.

12. The computer program product of claim 11, wherein generating comparative information includes making a duplicate copy of the received information and making at least one change to the duplicate copy.

13. The computer program product of claim 11, wherein performing the action further includes receiving comparative data based on the comparative information.

14. The computer program product of claim 13, wherein:

performing the action further includes determining a comparative predictive outcome based on the comparative data.

15. A computer system, comprising:

a memory; and a processor communicatively coupled to the memory, wherein the processor is configured to perform a method comprising:

receiving information pertaining to an intended service deployment;

receiving data pertaining to the intended service deployment based on the received information, wherein the data indicates amounts of time that previous successful executions of the intended service deployment have taken;

determining a predictive outcome of the intended service deployment based on the amounts of time that previous successful executions of the intended service deployment have taken; and performing an action based on the predictive outcome.

16. The system of claim 15, wherein receiving information pertaining to the intended service deployment includes receiving user input pertaining to the intended service deployment.

17. The system of claim 15, wherein:

the predictive outcome includes a predicted amount of time that the intended service deployment will take;

performing the action includes:

comparing the predicted amount of time to a threshold; and automatically generating comparative information pertaining to the intended service deployment in response to determining that the predicted amount of time exceeds the threshold;

the comparative information is based on the received information; and the comparative information is different from the received information.

18. The system of claim 17, wherein generating comparative information includes making a duplicate copy of the received information and making at least one change to the duplicate copy.

19. The system of claim 17, wherein:

performing the action further includes receiving comparative data based on the comparative information; and performing the action further includes determining a comparative predictive outcome based on the comparative data.

* * * * *